United States Patent [19]

Barton et al.

[11] Patent Number: 4,928,139
[45] Date of Patent: May 22, 1990

[54] ASSEMBLY CONTAINING A LINEAR FOCUSING MEANS AND METHOD OF MAKING SAME

[75] Inventors: James T. Barton, Fairport; Jimmy P. Walker, Rochester, both of N.Y.

[73] Assignee: Eastman Kodak Company, Rochester, N.Y.

[21] Appl. No.: 273,770

[22] Filed: Nov. 21, 1988

[51] Int. Cl.⁵ .......................................... G03B 27/00
[52] U.S. Cl. ......................................................... 355/1
[58] Field of Search ...................................... 355/1, 46

[56] References Cited
U.S. PATENT DOCUMENTS 4,427,284  1/1984  Dannatt .................................. 355/1
4,728,981  3/1988  Koek et al. ............................. 355/1

Primary Examiner—Donald A. Griffin
Attorney, Agent, or Firm—Leonard W. Treash

[57] ABSTRACT

A support for a linear source of radiation such as a linear LED array is fixed to a support for a linear light focusing means. A flange having a plurality of apertures which flange is fixed with respect to one of the supports receives a pin in each aperture which pin has a small cross-section compared to its respective aperture. A washer around each pin is fixed by adhesive to the flange and restricts movement of the pin laterally relative to the flange. The opening in the washer permits movement of the pin longitudinally which allows for thermal expansion of one support compared to the other.

16 Claims, 4 Drawing Sheets

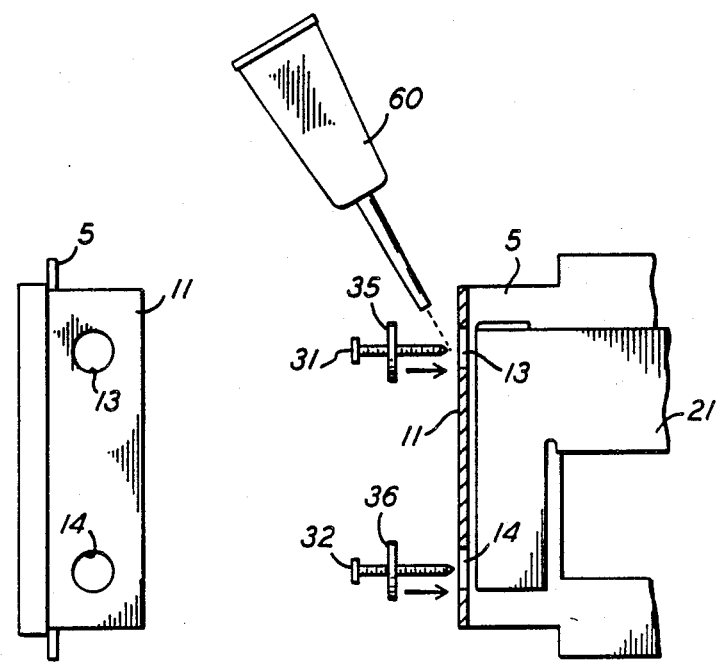
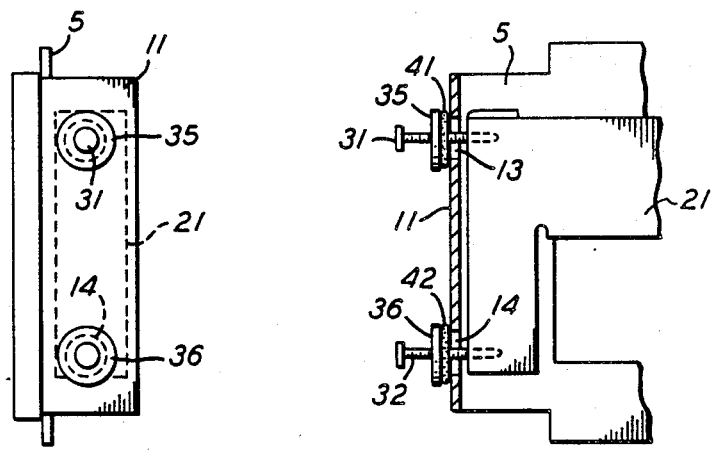
FIG. 2  FIG. 3
FIG. 4  FIG. 5

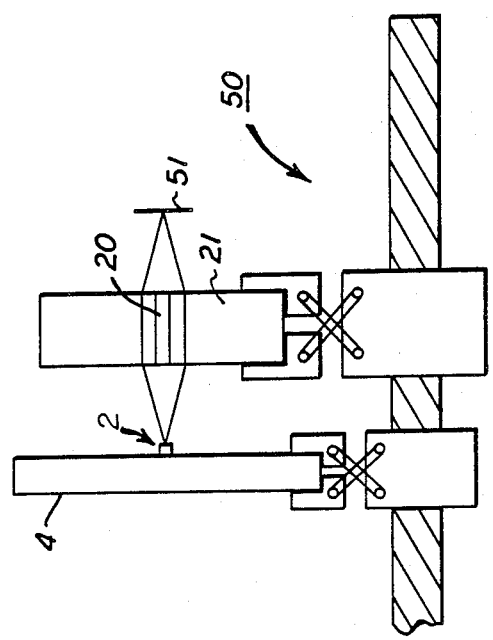
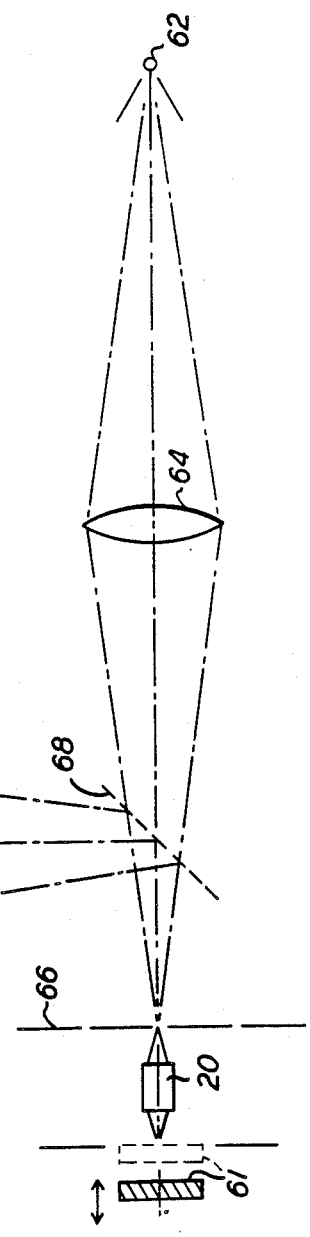
FIG. 6
FIG. 7

ASSEMBLY CONTAINING A LINEAR FOCUSING MEANS AND METHOD OF MAKING SAME

TECHNICAL FIELD

This invention relates to linear focusing assemblies and more specifically to means and method for locating a linear, radiation focusing means, for example, a linear lens array, with respect to a support for a linear source of radiation, for example, a linear array of light-emitting diodes.

BACKGROUND ART

U.S. Pat. No. 4,728,981 granted to Koek et al, Mar. 1, 1988 shows a linear printhead assembly including a linear array of light-emitting diodes (LED's) and a linear imaging lens array. A single row of LED's are imaged by the lens array onto a radiation sensitive surface. Such imaging lens arrays are commercially available as SELFOC (a trademark of Nippon Sheet Glass Co. Ltd.) lenses in a 1 or more row bundle of optical fibers as described in U.S. Pat. No. 3,658,407. Other linear lens arrays include reflecting surfaces, for example, roof mirror lens arrays are commercially available. For high resolution applications, linear lens arrays must be accurately positioned with respect to the array of LED's. Once positioned, the lens and LED assembly must in turn be positioned accurately with respect to the photosensitive surface.

The Koek patent describes a set of screws and slots for adjusting the distance between the LED array and the lens array as a first part of the assembly process. The screws and slots are located in supports for the lens and LED arrays. The second part of the assembly process, adjusting the distance from the lens to the sensitive surface is accomplished with a pair of mounting brackets which are attached to the lens-LED assembly also by a set of screws and slots. These brackets contain pins and holes which mate with holes and pins on the receiving apparatus to accurately position the assembly in the apparatus. The brackets are adjusted so that the position of the assembly is accurately set with respect to the pins and slots on the brackets and thus the assembly can be placed in any machine which has the receiving slots and pins accurately positioned with respect to the photosensitive surface.

The Koek patent also shows a structure for compensating for thermal expansion differences between the LED array and its support and the lens array and its support. Because of the heat generated by the LED array such variation in thermal expansion must be compensated for in this type of apparatus.

This general arrangement has been adopted commercially and has worked quite satisfactorily. However, within this system, it is desirable to improve the accuracy and reduce the expense associated with the first step in the process, i.e., fixing the location of the lens with respect to the row of LED's.

DISCLOSURE OF THE INVENTION

It is thus an object of the invention to provide a linear printhead assembly having a linear source of radiation, a linear radiation focusing means, a support for supporting the source, a support for supporting the focusing means and a means for accurately and simply fixing the supports with respect to each other.

It is also an object of this invention to provide such a printhead assembly in which variations in thermal expansion between the structure supporting the linear radiation focusing means and the structure supporting the linear source of radiation is compensated for in a simple and reliable manner.

It is also an object of this invention to provide a stand-alone linear lens array assembly which can be attached at a later time to a radiation source without further adjustment.

These and other objects are accomplished by a linear lens array assembly having a support for receiving a linear source of radiation, a linear radiation focusing means and a support for said focusing means. One of said supports includes means defining a plurality of apertures. A pin is located in each aperture and is fixed in the other support. Each pin has a cross section which is small compared to its aperture. A washer is carried by each pin. Each washer has an opening approximating the cross section of its pin to restrict lateral movement of the pin, and each washer is fixed by adhesive to the aperture defining means.

With this structure, assembly of a linear printhead assembly is both low cost and accurate. It is accomplished by a method which includes the steps of fixing each pin carrying its washer loosely in its aperture and firmly in the other support, accurately positioning the linear lens array with respect to the support for the linear radiation source, and fixing the washers to the aperture defining means, to laterally fix said lens array with respect to said radiation source support.

According to alternative preferred embodiments, the radiation source may be attached to its support during the mounting process or not. If the radiation source is attached to its support during the above method, it can be used for adjustment by projecting an image of the source by the lens array on a detector as part of the positioning step. However, there are many advantages in assembly that can be gained by an alternative approach which fixes the lens array with respect to the support in absence of the source. The source is then added at a later time (perhaps at a different site) without the need for further adjustment.

According to a preferred embodiment the washer opening is of a size permitting longitudinal sliding movement of the pin. With such permitted sliding movement, thermal expansion of the support for the LED array which is generally considerably greater than that for the support for the lens is compensated for.

BRIEF DESCRIPTION OF THE DRAWINGS

FIG. 2 is a side view of a mount frame portion of the assembly shown in FIG. 1.

FIG. 3 is a front partial section with portions partially exploded of the mount frame portion shown in FIG. 2 and a portion of a lens support shown in FIG. 1.

FIGS. 4 and 5 are a side view and front partial section, respectively, similar to FIGS. 2 and 3, but with the structure shown in an assembled condition.

FIG. 6 is a schematic side view of an adjusting device for positioning the components of a printhead assembly constructed according to the invention.

FIG. 7 is a schematic side view similar to FIG. 6 illustrating an alternative method of positioning the components of a linear lens array assembly according to the invention.

BEST MODE OF CARRYING OUT THE INVENTION

As used herein, the term "linear lens array assembly" shall include a linear lens array, its support and a support for a linear source of radiation. The term "linear printhead assembly" shall include a linear lens array assembly plus a linear source of radiation.

Figure 1:
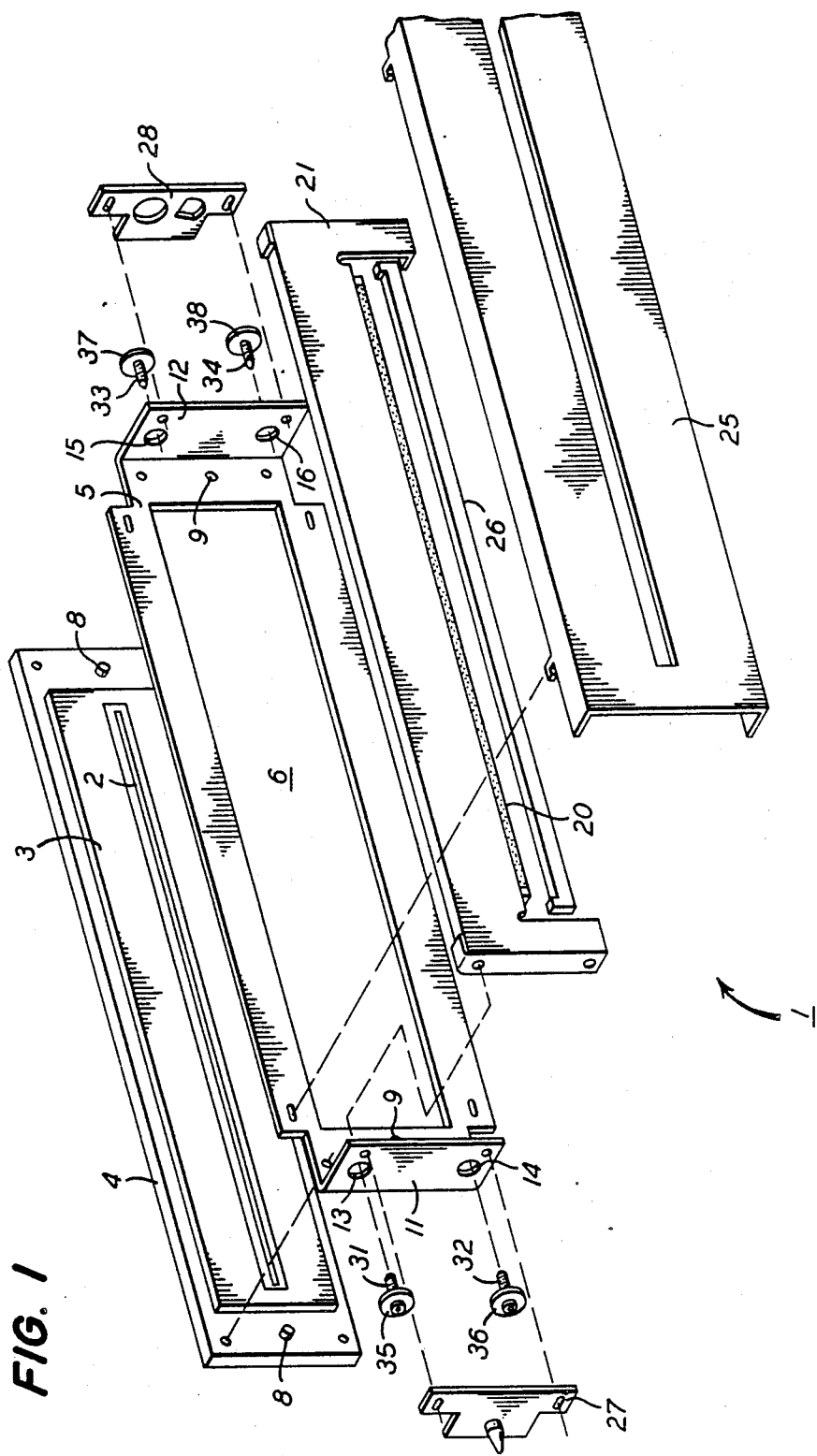
FIG. 1 is an exploded perspective view of a linear printhead assembly constructed according to the invention.

According to FIG. 1, a linear printhead assembly, for example, an LED printhead assembly 1 includes a linear source of radiation, for example, an array of LED's 2 carried on a baseplate 4 and protected by a cover 3. This combination of LED's, baseplate and cover is generally called an "LED printhead." The printhead may also include a finned heat sink 7 (see FIG. 8) on the side of the baseplate opposite the LED's. The printhead is assembled as part of the LED manufacturing process using suitable connectors and/or fastening materials. A support for receiving the printhead, for example, frame 5 is secured firmly to the baseplate 4 and has an opening 6 into which the cover 3 and the array of LED's project. Accurate location of the mount frame 5 with respect to the array of LED's is facilitated by a pair of pins 8 which project through holes 9 in the frame 5.

The frame 5 has, at each end, right angle flanges 11 and 12 which right angle flanges define apertures 13, 14, 15 and 16.

A linear light focusing means, for example, linear lens array 20 is fixed to a lens array support 21 which support also performs a stiffening function maintaining the linearity of the lens array. A seal 26 protects the array 20. The printhead assembly 1 also includes an assembly cover 25. Standoff brackets 27 and 28 are attached to right angle flanges 11 and 12 for locating the assembly in its intended apparatus.

As stated in U.S. Pat. No. 4,728,981 referred to above, lens array 20 must be accurately positioned with respect to LED array 2 both along its optical axis and vertically as shown in FIG. 1. Orientation horizontally, i.e., parallel to the long dimension of the linear array, is not as critical. Similarly, it is important that rotational position about all of the axes be accurate.

The basic principle behind the proper location of lens array 20 with respect to LED array 2 is illustrated schematically in FIG. 6. Lens array 20 and LED array 2 are independently mounted on a lens bench 50, which bench permits movement of both components along the optical axis and a variety of tilting and linear movements with respect to that axis and other axes orthogonal to it. The arrays, or portions of them, are turned on and imaged on a target 51. The resultant image is visually or electrooptically viewed and the components rotated and moved until they are located in a position producing the desired image on the target 51. At that point the supports for the two components are fixed with respect to each other and the standoff brackets are adjusted so that when the assembly is installed in a machine the image will be in focus on the desired photosensitive surface.

Referring to FIGS. 1-5, the support 5 for the LED array and the support 21 for the lens array are fixed using pins 31 through 34 and washers 35-38. The support for LED array 2 includes mount frame 5 and right angle flange 11 defining apertures 13 and 14. Pins 31 and 32 are intended to be inserted in apertures 13 and 14 but are small in cross section compared to apertures 13 and 14 (see FIG. 3). Washers 35 and 36 on the other hand have a relatively tight sliding fit with pins 31 and 32 and are larger in outside diameter then apertures 13 and 14.

With the supports positioned as shown in FIG. 6 on lens bench 50, pins 31 and 32 with washers 35 and 36 thereon are embedded in support 21 through apertures 13 and 14 to a depth which firmly fixes the pins in support 21 but which allows a portion thereof to extend outward through apertures 13 and 14. For this purpose pins 31 and 32 can be sheet metal screws.

The lens array and the LED array are then adjusted on the lens bench until an optimum position and orientation is reached between them. With the components in fine adjustment, the washers 35 and 36 are fixed to the right angle flange 11 by a suitable adhesive. For example, a capillary cyanoacrylate adhesive made by Locktite Co. can be used. The same procedure is followed with flange 12 containing apertures 15 and 16, using pins 33 and 34 and washers 37 and 38. The result (as to flange 11) is shown in FIGS. 4 and 5 with washers 35 and 36 shown fixed to flange 11 by small amounts of adhesive 41 and 42.

Pins 31, 32, 33 and 34 are free to slide in the openings in washers 35, 36, 37 and 38. This permits a slight amount of movement of the right angle flanges 11 and 12 due to thermal expansion of the support 5 for LED array 2 as the LED array becomes hotter than the support 21 for linear lens array 20. At the same time the washers restrict lateral movement of the pins thereby fixing the lens and LED arrays with respect to each other as to all movement except parallel to the pins (the long dimension of the arrays).

Figure 8:
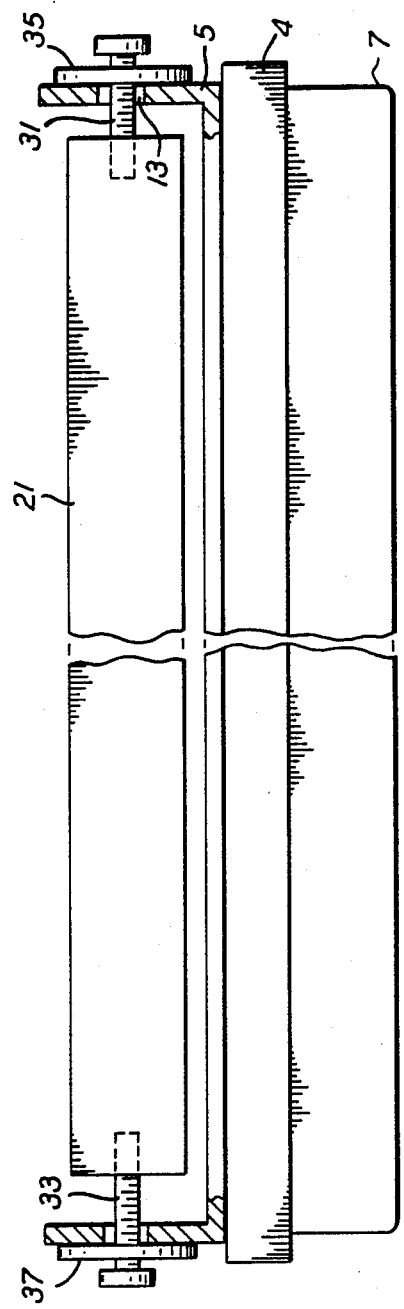
FIGS. 8 and 9 are top views of a portion of a linear printhead assembly constructed according to the invention and illustrating the thermal expansion of certain of the elements.
Figure 9:
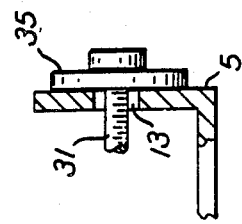

This aspect of the printhead assembly is illustrated in FIGS. 8 and 9. According to FIG. 8, washers 35 and 37 are fixed to frame 5. Pins 31 and 33 are screws having heads which, at normal temperatures, are separated from washers 35 and 37 by a small gap, for example, 0.005 inches. As the printhead heats up, frame 5 expands substantially more than lens array support 21 to the position shown in FIG. 9, with the screw heads flush with the washers.

The adhesive 41 and 42 can be administered by any suitable mechanism, for example, dispenser 60 shown schematically in FIG. 3.

Thus, a structure is provided which, with a small number of very inexpensive parts, provides both a simple fixation of the relative location of two critical optical components and also allows for variable thermal expansion of the supports of those components. The standoff brackets 27 and 28 are then properly positioned with respect to target 51 (FIG. 6) by suitable means (not shown), and attached to flanges 11 and 12. The actual determination of the best location for those components as shown schematically in FIG. 6 is old in the art and not part of this invention.

In many assembly situations, an alternative approach to assembling the same assembly is preferred. In the absence of the LED printhead, elements 2, 3 and 4 in FIG. 1, the printhead support, frame 5 is assembled to the lens array support 21 with the lens array 20 fixed thereto. This can be accomplished by a method illustrated in FIG. 7. In this embodiment, the absent printhead is replaced with an ordinary reflective surface 61 positioned at the same predetermined position that the LED's would be positioned and fixed temporarily to frame 5. The frame 5 and lens array are movable as in FIG. 6. An image of a linear source of light 62 is projected by suitable optics 64 onto a position 66 comparable to the position of the ultimate sensitive surface and commonly called the front conjugate position of the lens array 20. That image is imaged by lens array 20 on reflective surface 60 (the rear conjugate of lens array 20). The lens array 20 re-images that image back at the front conjugate and ultimately, through use of a beamsplitter 68 at a detector plane 70. Frame 5 and lens array support 21 are again moved until a condition of best focus is obtained, at which position the washers are again fixed to flanges 11 and 12. Standoff brackets 27 and 28 are also adjusted and fixed in place. This method produces a linear lens array assembly which can be moved to the location of manufacture of the printhead or some other assembly point and attached to the printhead without further adjustment. The resulting printhead assembly, as in the first embodiment can be placed in a printer or other like apparatus also without further adjustment.

The invention has been described in detail with particular reference to a preferred embodiment thereof, but it will be understood that variations and modifications can be effected within the spirit and scope of the invention as described hereinabove and as defined in the appended claims.

We claim:

1. A linear lens array assembly comprising:
   a support for receiving a linear source of radiation;
   a linear lens array;
   a support for said linear lens array;
   one of said supports including means defining a plurality of apertures,
   a pin located in each aperture and seated in the support other than the support having the aperture defining means, each pin having a cross section small compared to its aperture, and
   a washer carried by each pin and having an opening approximating the cross section of its pin to restrict lateral movement of said pin, each washer being fixed by adhesive to said aperture defining means.

2. The assembly according to claim 1 wherein said washers have an opening permitting longitudinal sliding movement of said pin.

3. A linear printhead assembly comprising:
   a linear source of radiation;
   a linear light focusing means,
   a support for supporting said source;
   a support for supporting said focusing means, and
   means for fixing said supports with respect to each other, characterized in that said fixing means includes
   means defining a plurality of apertures fixed with respect to one of said supports;
   a plurality of pins, one received in each such aperture, said pins being fixed in the other of said supports, each of said pins being small in cross section compared to its respective aperture; and
   a washer around each pin, said washer being fixed by adhesive to said aperture defining means and each washer having an opening restricting lateral movement of its respective pin.

4. The assembly according to claim 3 wherein said washer opening is of a size permitting longitudinal sliding movement of said pin.

5. A linear printhead assembly comprising:
   a linear array of light-emitting diodes;
   a linear lens array;
   a support for supporting said array of diodes;
   a support for supporting said lens array; and
   means for fixing said supports with respect to each other, characterized in that said fixing means includes
   a flange on said diode support having a plurality of apertures;
   a plurality of pins, one received in each such aperture, said pins being fixed in said lens array support, each of said pins being small in cross section compared to its respective aperture; and
   a washer around each pin, said washer being fixed by adhesive to said flange and each washer having an opening restricting lateral movement of its respective pin.

6. The assembly according to claim 5 wherein said washer opening is of a size permitting longitudinal sliding movement of said pin.

7. A linear printhead assembly comprising:
   a linear array of light-emitting diodes;
   a linear lens array;
   a support for supporting said array of diodes;
   a support for supporting said lens array; and
   means for fixing said supports with respect to each other, characterized in that said fixing means includes
   two flanges positioned on opposite ends of said diode array support, each flange having a plurality of apertures;
   a plurality of pins, one received in each such aperture, said pins being fixed in said lens array support, each of said pins being small in cross section compared to its respective aperture; and
   a washer around each pin, said washer being fixed by adhesive to its respective flange and each washer having an opening restricting lateral movement of its respective pin and permitting longitudinal sliding movement of said pin in its opening.

8. A linear light focusing means assembly which is adapted to receive a linear source of radiation and to be installed in operative condition in a printing apparatus without refocusing, comprising:
   a linear light focusing means;
   a support for said focusing means;
   a support for receiving a linear source of radiation in a first predetermined position, said supports being fixed to each other without said linear source of radiation and with said predetermined position at a first conjugate position of said focusing means and said supports including means for fixing said assembly in said printing apparatus with a second predetermined position at a second conjugate position of said focusing means complementary to said first position.

9. A method of mounting a linear lens array assembly, said assembly including a support for receiving a linear radiation source, a linear lens array and a support for supporting said linear lens array, one of said support including means defining a plurality of apertures, said method comprising:
   fixing a pin carrying a washer loosely in each aperture and firmly in the the support not having the apertures, said pin being of a cross section small compared to its respective aperture and each washer having an opening substantially the same as its pin cross section to restrict lateral movement of its respective pin;

accurately positioning said lens array with respect to said radiation source support, and fixing said washers to said aperture defining means to laterally fix said lens array with respect to said radiation source support.

10. Method according to claim 9 wherein said fixing step includes adhesively fixing said washers to said aperture defining means.

11. A method of mounting a linear printhead assembly, said assembly including:

a linear array of light-emitting diodes;

a linear lens array;

a support for supporting said array of diodes having means defining a plurality of apertures;

a support for supporting said lens array;

said method comprising:

fixing a pin carrying a washer loosely in each aperture and firmly in said support for said lens array, said pin being of a cross section small compared to its respective aperture and each washer having an opening restricting lateral movement of its respective pin and permitting longitudinal sliding movement of said pin;

accurately positioning said lens array with respect to said diode array; and fixing said washers to said aperture defining means to laterally fix said diode array with respect to said lens array.

12. Method according to claim 10 wherein said fixing step includes adhesively fixing said washers to said aperture defining means.

13. A method of mounting a linear lens array assembly, said assembly including a first support for receiving a linear radiation source at a predetermined position, a linear lens array and a second support for supporting said linear lens array, said method comprising:

positioning a reflective surface at said predetermined position with respect to said first support, projecting a linear source of light optically, in order, through said linear lens array, off said reflective surface, back through said lens array and onto a position at which focus can be determined, moving said supports with respect to each other and said position until a condition of best focus is obtained at said position, and then fixing said supports with respect to each other so that a linear radiation source can be received in said assembly without further adjustment.

14. The method according to claim 13 further including after said moving step, the step of fixing the position of support means for said assembly in an intended apparatus with respect to said assembly so that said assembly can both receive such a linear radiation source and be inserted in the apparatus without further adjustment.

15. In a linear lens array assembly including a linear lens array and a support for said lens array and a second support with respect to which said lens array is accurately positioned to establish its focus, the improvement wherein one of said supports includes means defining a plurality of apertures, and said assembly includes a pin located in each aperture and seated in the support other than the support having the aperture defining means, each pin having a cross-section small compared to its aperture, and a washer carried by each pin and having an opening approximating the cross-section of its pin to restrict lateral movement of said pin, each washer being fixed by adhesive to said aperture defining means.

16. The assembly according to claim 15 wherein said washers have an opening permitting longitudinal sliding movement of said pin.

* * * * *